Oct. 3, 1950  G. D. WILLITS  2,524,555
OIL THROWER FOR DYNAMOELECTRIC MACHINES
Filed June 17, 1949
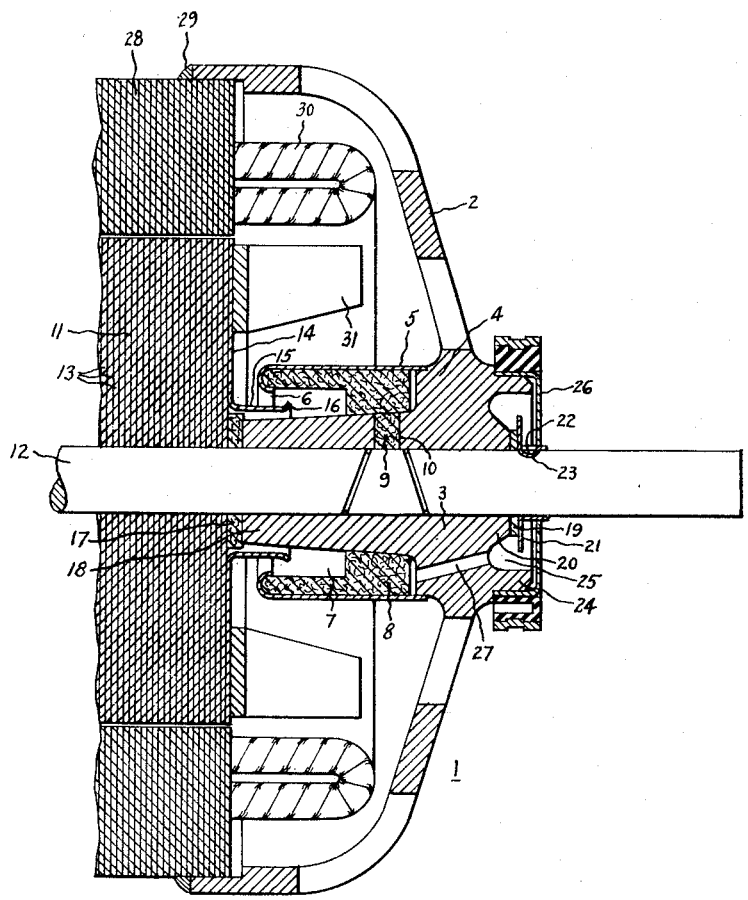
Inventor:
Glenn D. Willits,
by  Bravell & Mack
His Attorney.

Patented Oct. 3, 1950

2,524,555

UNITED STATES PATENT OFFICE 2,524,555

OIL THROWER FOR DYNAMOELECTRIC MACHINES

Glenn D. Willits, Leo, Ind., assignor to General Electric Company, a corporation of New York Application June 17, 1949, Serial No. 99,643

5 Claims. (Cl. 172—120)

My invention relates to a dynamoelectric machine and, more particularly, to such a machine incorporating a rotor structure which includes a liquid lubricant thrower to return liquid lubricant from the rotor to a stationary lubricant reservoir.

It is common practice in dynamoelectric machines of small and medium size to employ sleeve bearings lubricated with a liquid lubricant. Such lubricant is retained in a suitable lubricant reservoir which may consist of a fibrous packing material with means to feed the liquid lubricant from the reservoir onto the bearing surfaces. The lubricant is then moved axially along the bearing surfaces by grooves in the rotor shaft or other means until it escapes at the ends of the bearing.

It is also common practice to have a so-called oil slinger or liquid lubricant thrower to return this escaping oil to the liquid lubricant reservoir. This thrower usually consists of a radially outwardly extending flange member from which the liquid lubricant is thrown back into the liquid lubricant reservoir by centrifugal force. Up to this time it has often been the practice to provide such a liquid lubricant thrower as a separate component in the rotor assembly in dynamoelectric machines, as shown in Patent 2,306,743 to Wayne J. Morrill, assigned to the assignee of this application. In the interests of saving materials, labor, and weight in the construction of such dynamoelectric machines, it is desirable that the liquid lubricant thrower be incorporated into the structure of other existing rotor components.

It is, therefore, an object of my invention to provide an improved dynamoelectric machine having a liquid lubricant thrower for the rotor which is an integral part of the magnetic structure of the rotor.

My invention, therefore, consists essentially of a dynamoelectric machine having a laminated rotor and a liquid lubricant thrower which is formed from the center portion of the end lamination of the rotor.

Further objects and advantages of this invention will become apparent and the invention will be better understood from the following description referring to the accompanying drawing, and the features of novelty which characterize this invention will be pointed out with particularity in the claims annexed to and forming part of this specification.

Referring now to the drawing, there is shown a view, partly in section, of one end of a small unit bearing dynamoelectric machine designated as a whole by the numeral 1 and provided with an end shield 2 with a sleeve bearing 3 formed integral therewith and extending toward the interior of the machine. The end shield 2 is provided with a hub portion 4 to which a cylindrical cup member 5 is secured. The cup member 5 is provided with a re-entrant opening 6 and forms, with the end shield 2, a lubricant reservoir 7. Absorbent packing material 8 is positioned in the lubricant reservoir 7 and feeds lubricant to lubricant feeding means such as a wick 9 which is positioned in a transverse opening 10 in the surface of the bearing 3. A rotor 11 of the dynamoelectric machine is rotatably supported by means of rotor shaft 12 in bearing 3 and comprises a plurality of stacked laminations 13 of magnetic material. End lamination 14 includes a tubular hub portion 15 which extends through the re-entrant opening 6 of the cover member 5 and, at its inner rim, has an annular flange 16 which serves to throw any liquid lubricant, which escapes from the inner end of the bearing onto the rotor, back into lubricant reservoir 7.

The tubular hub portion 15 with its flange or rim 16 may be formed in end lamination 14 by the use of multiple-stage drawing dies before the assembly of the rotor laminations on the shaft. This provision for an oil slinger eliminates the necessity for a separate drawn cup liquid lubricant slinger previously required.

A resilient washer 17 is positioned between the magnetic structure of the rotor and the end 18 of the bearing and the end play of the shaft 11 is adjusted by a molded resinous washer 19 abutting the other end 20 of the bearing 3, the washer 19 being held in place by a snap ring washer 21 which is positioned by a spring finger 22 which fits into a depression 23 in the surface of shaft 11. The snap ring washer 21 also serves as a liquid lubricant thrower at the outer end 20 of bearing 3. A cylindrical flanged portion 24 forms an end cavity 25 which is closed by a cover plate 26. An oil return opening 27 is provided in the end shield 2 between the end cavity 25 and the lubricant reservoir 7.

A magnetic stator structure 28 for magnetic cooperation with rotor 11 is fixed to end shield 2 at 29. Within stator structure 28, stator coils 30 are fitted. Rotor 11 is provided with fan blades 31 to assist in cooling the dynamoelectric machine.

It will, therefore, be seen that by the improved structure for a dynamoelectric machine provided for in my invention, one part has been eliminated in the magnetic structure of the rotor assembly, An important advantage of my invention is, therefore, that fewer parts need be fabricated and the process of assembly is simplified since fewer parts need be assembled. It will be further seen that the hub portion of the end rotor punching which is drawn out to form the oil slinger is not otherwise particularly useful magnetically in a conventional machine since the major portion of the magnetic flux is carried near the periphery of the rotor in the vicinity of the rotor windings. Thus a relatively useless portion of one component, by a modification in structure, is made to serve the purpose of, and thereby eliminate, another component.

Therefore, while I have shown a particular embodiment of my invention, it will of course be understood that I do not wish to be limited thereto since various modifications may be made, and I contemplate by the appended claims to cover any such modifications as fall within the true spirit and scope of my invention.

What I claim as new and desire to secure by Letters Patent of the United States is:

1. In a dynamoelectric machine, a bearing and a liquid lubricant reservoir structure surrounding said bearing for the lubrication thereof, a rotor including a shaft supported in said bearing and a magnetic structure adjacent to said bearing, said magnetic structure including a full sized end lamination having a tubular hub extending into said liquid lubricant reservoir structure and a radially outwardly extending rim on said tubular hub to serve as an oil thrower.

2. In a dynamoelectric machine, a rotor including a shaft and a magnetic structure, a bearing adapted for the use of liquid lubricant for cooperation with said shaft adjacent to said magnetic structure, said magnetic structure including an outermost lamination having a tubular hub extending towards said bearing, said hub having a radially outwardly extending rim to serve as an oil thrower.

3. In a rotor for a dynamoelectric machine comprising a plurality of laminations of magnetic material, an outermost lamination having a tubular hub which extends axially away from said rotor laminations, said hub having a radially outwardly extending rim at the end thereof to serve as an oil thrower.

4. An oil thrower adapted to extend into the lubricant reservoir for a bearing of a dynamoelectric machine having a laminated rotor, said oil thrower comprising a tubular hub formed integrally with the outermost lamination of the rotor.

5. An oil thrower adapted to be positioned in the reentrant opening of a lubricant reservoir surrounding a bearing of a dynamoelectric machine having a laminated rotor, said oil thrower comprising a tubular hub formed from the central portion of the end lamination of the rotor.

GLENN D. WILLITS.

REFERENCES CITED

The following references are of record in the file of this patent:

UNITED STATES PATENTS

| Number | Name | Date |
|---|---|---|
| 1,601,122 | Janette | Sept. 28, 1926 |
| 2,306,743 | Morrill | Dec. 29, 1942 |